United States Patent [19]

McVay et al.

[11] 4,361,021
[45] Nov. 30, 1982

[54] METHOD AND APPARATUS FOR FORMING ANGLE RING FLANGES

[75] Inventors: Robert D. McVay, Pickerington; Herman J. Schaeufele, Columbus, both of Ohio

[73] Assignee: United McGill Corporation, Columbus, Ohio

[21] Appl. No.: 146,433

[22] Filed: May 5, 1980

[51] Int. Cl.³ .................. B21B 5/00; B21D 17/04; B21H 1/06
[52] U.S. Cl. ................................ 72/71; 72/129; 72/166; 72/204; 29/412; 29/415
[58] Field of Search ............. 72/71, 72, 129, 130, 72/166, 204, 365, 366; 29/411, 412, 415, 159.1, 414; 113/116 D, 116 BB, 120 N

[56] References Cited

U.S. PATENT DOCUMENTS

| | | | |
|---|---|---|---|
| 1,464,318 | 8/1923 | Hauf | 72/71 |
| 1,710,930 | 4/1929 | Klaus | 29/414 X |
| 2,139,682 | 12/1938 | Hothersall | 72/71 |
| 2,247,002 | 6/1941 | Rendleman | 113/116 D |
| 2,253,499 | 8/1941 | Rutenber | 113/116 BB |
| 3,438,111 | 4/1969 | Wilcox | 29/159.1 |

FOREIGN PATENT DOCUMENTS 610577  6/1978  U.S.S.R. .................. 72/204

Primary Examiner—Lowell A. Larson
Attorney, Agent, or Firm—LeBlanc, Nolan, Shur & Nies

[57] ABSTRACT

A method and tooling for making angle ring flanges from relatively light gauge sheet metal. The method starts with a flat strip of sheet metal from which two angle ring flanges are formed. The strip is rolled and butt welded into a band, the butt weld is broached on both surfaces at the weld line to the thickness of the sheet metal band. The band is placed in a roll forming machine between a set of two forming rolls which rotate and merge to rotate the band and form it into a ring of channel section with outward facing channel legs at 90° to the channel base. One roll is male and pushes the center half of the band down into the female roll and the outer quarters of the band are forced into the clearance between the male and female forming rolls to form the standing legs or flanges of the finished channel section. The male roll has an annular central groove and the female roll includes a shearing cutter disc which is complementary to the annular groove. When the channel ring is finish formed, the roll sets are merged a further amount and the cutter disc cooperates with the groove in the male roll and shears a narrow ring portion of sheet metal from the channel base resulting in two identical angle ring flanges.

9 Claims, 10 Drawing Figures

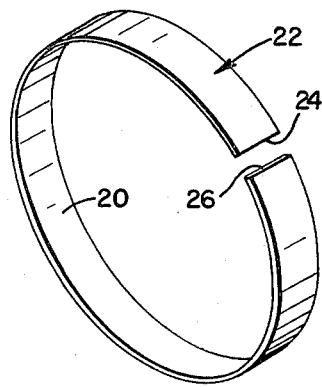
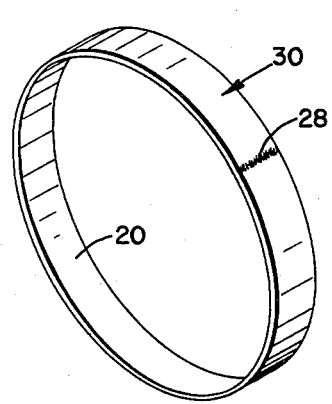
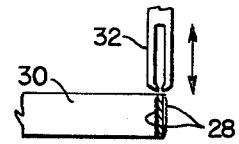
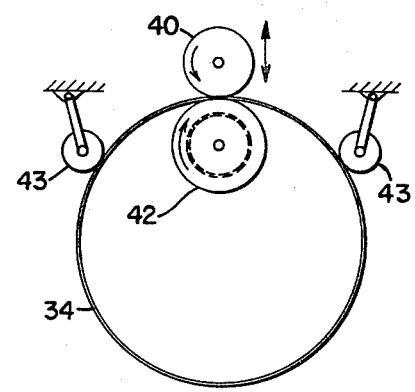
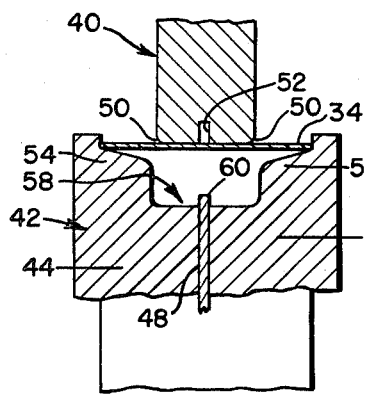
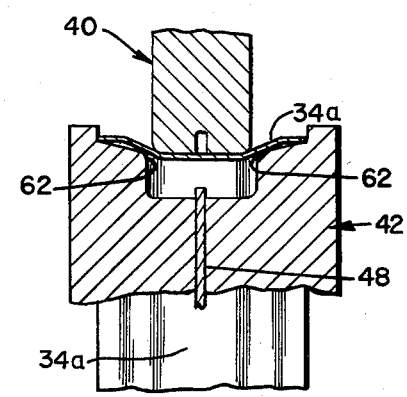
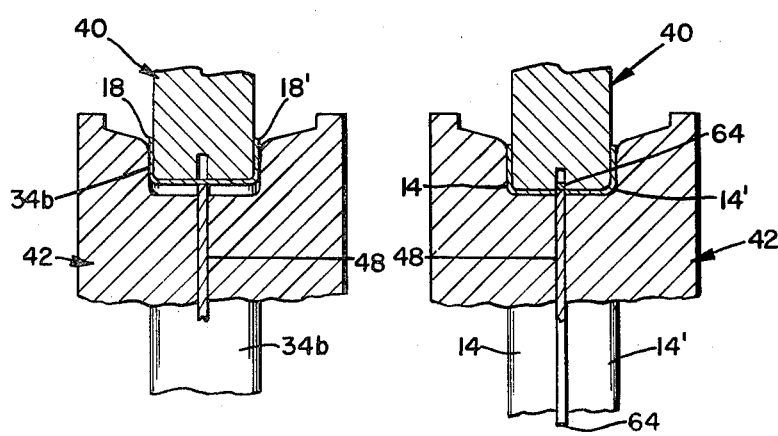

METHOD AND APPARATUS FOR FORMING ANGLE RING FLANGES

BACKGROUND OF THE INVENTION

In the field of sheet metal duct systems, round angle flanges are an important item, being used to connect sections of duct as reinforcements and to enable attachment of hangers. Previously known commercially available ring flanges, particularly in the larger diameters, are over-designed for sheet metal ductwork. Many are made from angle iron which is rolled into a helix, cut and welded. Others are made from angle iron which is cut, rolled and welded, while other angle ring flanges, particularly small sizes, are stamped and formed in a single stamping operation. Another method which has been attempted is to roll form a single angle ring flange from a flat strip of sheet metal. To an extent this latter attempt has been successful on larger diameter heavy gauge flange rings but even so the resulting standing flange had a curvature and when lighter gauge sheet metal and small diameters were used the single flange would slip sideways in the rolls resulting in a ruined angle ring flange.

The method of the present invention was developed to make lightweight angle ring flanges from lightweight formable sheet metal to avoid the unnecessarily heavy gauge ring flanges previously in common use. This has been a highly desirable development in that it decreases the weight of the assembled duct system as well as decreasing the cost of the base material. The lightweight angle ring flanges could not be satisfactorily made by single angle forming rolls so the present method of roll-forming a channel shape, effectively two joined angle ring flanges, and cutting the channel in half was developed and to avoid the necessity of two separate operations a special set of forming rolls was developed to enable finish forming the dual flange channel form and then shear cutting the channel in one continuous rolling operation and the unique set of rolls was developed to result in a clean shearing action which avoids a sharp edge offset along the sheared edge.

The prior art discloses various aspects of roll forming annular members with various contours from strip blanks which are rolled and welded to provide an annular flat band of sheet metal which is then formed through further steps to a final ring shaped or circular shaped item. Such prior art processes can be seen in the following U.S. Pat. Nos.: F. R. Klaus 1,710,930 issued Apr. 30, 1929 and J. M. Hothersall 2,139,682 issued Dec. 13, 1938 disclose methods of roll forming an annular blank into a double contour ring shape and without removing the shaped form from the rolls, cut or shear the form into two substantially identical items. Both patents disclose that further subsequent forming steps are performed on the severed items. E. A. Nelson U.S. Pat. No. 2,095,343 issued Oct. 12, 1937; A. S. Van Halteren U.S. Pat. No. 2,112,697 issued Mar. 29, 1938; C. W. Sinclair U.S. Pat. No. 2,151,568 issued Mar. 21, 1939; N. C. Rendleman U.S. Pat. No. 2,247,002 issued June 24, 1941; A. S. Van Halteren et al U.S. Pat. No. 2,316,029 issued Apr. 6, 1943; and E. G. Spisak U.S. Pat. No. 4,068,362 issued Jan. 17, 1978 disclose methods of roll forming an annular blank into a double contour circular shape form and subsequently performing a separate operation to cut or saw the form into two substantially identical pieces. Other patents which disclose a method starting with a flat strip blank, then rolling, welding and form shaping the blank to a single finished item are O. M. Whitten U.S. Pat. No. 2,200,569, issued May 14, 1940; V. Fincl et al U.S. Pat. No. 3,862,563 issued Jan. 28, 1975; E. G. Spisak U.S. Pat. No. 4,084,526 issued Apr. 18, 1978 and W. Bosch U.S. Pat. No. 4,143,533 issued Mar. 13, 1979.

SUMMARY OF THE INVENTION

A primary object of the present invention resides in the novel method of roll forming a formable sheet material, dual, ring angle flange part of channel shape and shear cutting a narrow ring of material from the base of the channel shaped part as a final step of a continuous roll-forming operation to result in two substantially identical finished angle ring flanges. In conjunction with this method, the overall novel method starts with forming flat strip blanks of sheet metal material, rolling the strip blanks into circles, welding the ends of the circles, machining the welded joints and subsequently roll forming to the finished angle ring flanges.

Still another object resides in the novel method of forming two angle ring flanges from sheet metal by the steps of forming a blank strip of flat sheet metal having a width at least equal to four times the height of the standing leg of the desired angle ring flanges, forming the strip into an annular shape, butt welding the ends of the strip to provide an annular band, machining the weld portion to a thickness equal to the sheet metal thickness, rolling the band in special forming rolls to a channel ring shape with outwardly disposed channel flanges by progressively merging the forming rolls, causing the forming rolls to undergo a final merging movement to simultaneously rotate the channel form and shear a narrow ring of metal from the center of the base of the finished ring shaped channel to make two substantially identical angle ring flanges. Further objects reside in: using the above method on sheet metal; and using the method on any formable sheet material including galvanized sheet steel, stainless sheet steel and aluminum sheet.

A further object of this invention resides in providing a unique set of male/female forming rolls which mate against a flat annular blank of sheet metal material forming it into a channel with 90° outwardly directed flange legs and including, within the structure of the forming rolls, mating structure for outwardly shearing a narrow ring of material from the center of the base wall of the finish formed channel.

A still further object resides in providing the aforesaid set of forming rolls consisting of a male forming roll having a width dimension equal to the inner width dimension of a sheet metal channel to be formed with a parallel walled annular groove formed centrally of its peripheral surface and a female forming roll having internal side forming walls spaced apart a distance equal to the width of the male roll plus a dimension equal to twice the thickness of the sheet metal to be formed and having a shearing disc fixed centrally of the base inside the female roll means, the male forming roll and female forming roll to be arranged in a roll forming machine to merge together so the male roll can be moved into the space between the side walls of the female roll and the shearing disc will be aligned with and coact with the annular groove in the male roll to provide a shearing action on a sheet metal piece between the two rolls.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings, in which:

FIG. 1 is a plan view of a sheet metal blank used in the inventive method for forming two angle ring flanges;

FIGS. 2, 3 and 4 illustrate the steps of rolling the blank into a circular band, butt welding the ends of the band and broaching the butt weld;

FIG. 5 is a schematic view illustrating the band placed in a roll forming machine between the set of forming rolls;

FIGS. 6, 7 and 8 are partial cross-sections of the male and female forming rolls respectively showing the stages of merging the rolls and forming the blank band into a finished ring channel;

FIG. 9 is a view similar to FIGS. 6–8 but illustrating the final forming step where the two rolls undergo a final deep merging movement to shear a narrow metal ring from the center of the channel base; and FIG. 10 illustrates in partial section view the resultant two identical angle ring flanges.

GENERAL DESCRIPTION

The drawing FIGS. 1, 2, 3 and 4 schematically illustrate the initial steps of the method of making a dual set of identical angle ring flanges 14, 14' (FIG. 10) which have a cylindrical base portion 16, 16' and vertical flange legs 18, 18' formed 90° to the base flange.

FIG. 1 shows a strip 20 of formable sheet material which is obtained from larger sheet material by slitting and/or shearing. Actually the gauge of the metal sheet is selective but the method was developed in order to successfully make angle ring flanges in a wide range of diameters from light weight sheet metal, e.g., specifically in the range of from 10 to 20 gauge. Smaller ring flanges could be made from lighter gauge materials, e.g., 30 gauge but lighter gauge material may not be able to accommodate the material stretching which is necessary to make standing flange legs of larger diameter rings such as a 2" leg on a 40" diameter ring. The sheet materials can be any formable metal material and the method has been used with satisfactory, acceptable results on galvanized steel sheet, stainless steel sheet, and aluminum sheet.

The length of strip 20 determines the diameter of the finished angle ring flange, however because of metal flow and deformation during the roll forming process the strip must initially be slightly longer than the desired finished ring circumference. The initial length can be readily determined but varies depending on the material, the gauge of material and the desired diameter of the finished part. This metal flow deformation aspect is known from previously used roll forming processes and is not considered per se a part of the present invention.

The strip 20 is next roll-formed on a conventional machine into a circle form 22, as shown in FIG. 2. The flat annular blank 22 will next have the ends 24 and 26 placed together and butt welded at 28 so the blank 22 becomes a flat annular ring 30 with a ridged weld line 28 on the inner and outer surface of the ring as seen in FIG. 4. The butt welding opertion is carried out in a commercially available electric welding machine which clamps the ends of ring 22 in abutment and automatically welds the joint.

The weld ridges 28 are machined so the weld line becomes the same thickness as the metal sheet. This step is shown in FIG. 4 where a vertical double cutting tool 32 is used to simultaneously broach the weld ridges 28 from both sides of welded joinder line. A satisfactory machine is a vertically pneumatic press where the welded ring 30 is clamped in a jig on the press bed and the press head moves the broaching tool 32 (embracing the ring wall) down past the ring weld ridges so in one pass the ridges are machined to desired thickness.

The resultant blank is now a flat annular ring shape 34 of constant thickness and is ready for the final roll-forming operation in a rotary roll-forming machine as is shown schematically in FIG. 5. Rotary roll-forming machines are conventional, commercially available machines and will normally include a set (or sets) of forming rolls such as rolls 40 and 42 and spring loaded adjustable idler rolls 44. One or both of the rotatable driven forming rolls 40 and 42 are progressively shiftable toward each other as the roll-forming progresses. Idler rolls 44 can be adjusted closer to or further away from the forming rolls to accommodate different diameter ring blanks. Although the rotary roll-forming machines are not per se a part of the present invention the specific shapes and construction of the roll set 40 and 42 are novel and part of the present invention.

In the present arrangement, the roll set includes a special shaped male roll 40 which can be a single or multiple piece part and a mating special female roll 42 which, while referred to hereinafter as a female roll, is a female roll assembly consisting of two complementary angle forming rolls 44 and 46 sandwiching a shearing cutter disc 48 therebetween. The two rolls 44 and 46 and the cutter disc are clamped together on and keyed to an axle or power driven arbor in a conventional manner, not shown, so that the machine power driven train will rotate the female roll 42 as an integral unit. Male forming roll 40 is rotatably driven and mounted on an adjustable slide or arm which can be moved mechanically to cause the roll set to merge, the male roll 40 moving deeper into the flanged recess in the periphery of the female roll 42. Alternatively, the female roll can be mounted on an adjustable slide to obtain the relative movement.

All of the forming rolls 40, 44 and 46 are made from hardened metal, a satisfactory material being Tool Steel Designation A-2, heat treated to Rockwell 58. The shearing cutter disc 48 is made from a suitable cutting steel, a satisfactory material being Tool Steel Designation L-6, heat treated to Rockwell 54.

The male forming roll 40 has a cylindrical periphery and a width dimension equal to the inner width dimension of a channel to be formed from the flat ring blank 34 and its peripheral edges 50 are contoured with a small $\frac{3}{8}$" radius quarter round curvature. Midway of the periphery of roll 40 is a radial, parallel walled shearing groove 52 approximately $\frac{1}{8}$" or 3 mm. in width and having a 90° intersection with the roll periphery.

The female roll set 42 is dimensioned so the space between the vertical forming flanges 54, 56 is equal to twice the dimension of a flange 16 on the desired finished angle ring flange 14, plus the thickness of the cutter disc 48 (approximately 3 mm.) which is dimensioned to pass into the male roll groove 52 with a shearing sliding fit. The depth of the flat inside surfaces of flanges 54, 56 of the female roll set are at least equal to the desired height dimension of a standing leg of an angle ring flange 14. The radial dimension of cutter disc 48 is greater than the radial dimension of the base wall surface 58 of female roll set 42 by an amount which is slightly greater than the gauge thickness of the sheet material being formed.

Male forming roll 40 can be merged into the female roll set down to the base wall surface 58 where the peripheral portion 60 of the cutter disc 48 is aligned with and passes into the male roll groove 52.

In the roll forming process, a pre-conditioned flat annular ring blank 34 is located between rolls 40 and 42 as in FIG. 6. The rolls start rotating and rotate the blank 34 while the male roll 40 is progressively forced to a merging condition relative to female roll 42 as in FIG. 7, pushing the center half of the flank 34 down toward the base 58 of the female roll peripheral recess. The inside peripheral corners of the female roll set flanges 54 and 56, from a slightly slanted peripheral surface, 15°, have a contoured curvature 62 of $\frac{3}{8}''$ radius so continual pressure of the rotating rolls as they merge, bend forms the outer quarters of the blank 34 gradually upward as shown by the partially formed blank 34a in FIG. 7. Roll merging continues until the rolls 40 and 42 reach a stage shown in FIG. 8 where the blank has been completely finish formed into a channel shape 34b in which the channel base is disposed across the flat periphery of the male forming roll 40 and the standing legs 18 and 18' of the channel 34b will occupy the radial spacing between the outer side surfaces of the male roll 40 and the inner side surfaces of the female roll set 42. At this stage the channel base is adjacent the periphery of the cutter disc 48.

The final operation occurs with the rolls 40 and 42 still rotating and rotating the ring channel 34b, and consists of a rapid final deep merging of the two rolls 40 and 42 so the cutter disc 48 shear forces an arcuate segment of the channel base into male roll groove 52 and continued rotation of the rolls, rotating the ring through a 360° rotation, shears a narrow ring of metal 64 from the ring channel base and separates the ring channel into two identical angle ring flanges 14 and 14'. The rolls 40 and 42 are now moved away from merged engagement and the two finished flanges 14 and 14' are removed.

During the final roll-forming, the metal in the upstanding leg is stretched a considerable amount and should a crack appear at the weld line a manual touch-up welding and machining operation can be accomplished to avoid rejecting an otherwise finished angle ring flange. Note that the desirable height of an upstanding flange leg should be a minimum of 1 or 1.25" to accommodate bolt holes.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of forming angle ring flanges from sheet metal comprising: forming a blank strip of flat sheet metal having a width at least equal to four times the height of the desired standing leg of the resultant angle ring flanges; forming the strip into an annular shape; butt welding the ends of the strip to provide an annular band; machining the weld portion to a thickness substantially equal to the sheet metal thickness; rotating and rolling the band in forming rolls to a channel ring shape with a cylindrical base and outwardly disposed substantially right angle channel flanges by progressively merging the forming rolls; and with the channel form in its finish formed channel shape still in the forming rolls, causing the forming rolls to undergo a final merging movement to continue rotating the channel and to simultaneously shear a narrow ring of metal from the center of the base of the finish formed ring shaped channel to make two substantially identical substantially right angle ring flanges.

2. A method as defined in claim 1, wherein the blank strip is formed with a length longer than the desired finished circumference of the angle flange base.

3. A method as defined in claim 1 or 2, wherein the sheet metal is selected with a thickness in the range of 10 to 20 gauge.

4. A method as defined in claim 1, wherein a final touch-up welding and machining operation is accomplished to join weld cracks on the weld line of the upstanding angle flange legs.

5. A method of forming angle ring flanges from an annular band of sheet metal comprising: rolling the band in forming rolls to a channel ring shape with a cylindrical base and with outwardly disposed substantially right angle channel flanges by progressively merging the forming rolls to finish form the channel ring shape; and with the finish formed channel still in the forming rolls causing the forming rolls to undergo a final merging movement to continue to rotate the channel and to simultaneously shear a narrow ring of metal from the center of the base of the finish formed ring shaped channel to make two substantially identical substantially right angle ring flanges.

6. A method as defined in claim 5, wherein the sheet metal band has a thickness in the range of from 10 to 20 gauge.

7. In a roll forming machine for successively roll forming a sheet metal ring channel and outwardly shearing a narrow metal band from the base of the formed channel, a roll set comprising: a male forming roll having a width dimension equal to the inner width dimension of a substantially right angled channel to be formed and having a parallel walled annular shearing groove formed centrally of its peripheral surface; and a female forming roll means having internal side forming walls having a depth dimension approximately equal to the height dimension of the flanges of the channel to be formed and spaced apart a distance equal to the width of said male roll plus a dimension equal to twice the thickness of the sheet metal to be formed and having a shearing cutter disc fixed centrally of the base of the female roll means and projecting radially beyond the base a distance at least as great as the thickness of the sheet metal being formed; said male forming roll and said female forming roll means arranged to merge together so the male roll passes into the space between the side walls of the female roll means and with the shearing cutter disc aligned with and adapted to fit into said annular groove in the male roll, the depth of the female side forming walls being sufficient to accommodate finish forming of a ring channel before the two forming rolls are merged to a condition where the shearing cutter disc would engage the base of the finish formed channel.

8. A roll set as defined in claim 7, wherein said male forming roll is a single unitary part and said female roll forming means comprises two complimentary angle forming rolls with said shearing cutter disc non-rotatably secured coaxially therebetween.

9. For use in combination with a roll forming machine for successively roll forming a sheet metal ring channel and outwardly shearing a narrow metal band from the base of the formed channel, a roll forming set of two rolls adapted to merge during a forming operation comprising a male forming roll and a female forming roll means contoured to finish form a substantially right angled channel with a cylindrical base from a sheet metal annular band, said roll forming set including means to enable a double shearing action against a sheet metal base of a formed channel workpiece to cut a narrow ring of metal from the sheet metal base as the male forming roll merges fully into the female forming roll means, the contours of said male roll and said female roll means enabling a complete roll forming of a finish formed ring channel shape before the rolls are merged to a condition where double shearing action commences.

* * * * *